US006977744B2

(12) United States Patent
Taranath et al.

(10) Patent No.: US 6,977,744 B2
(45) Date of Patent: Dec. 20, 2005

(54) WEB BASED CLIENT SIDE BATCH PRINTING

(75) Inventors: Arvind Taranath, Milpitas, CA (US); Floyd B. S. Lewis, San Ramon, CA (US); Vasuki Kasturi, Sunnyvale, CA (US)

(73) Assignee: General Electric Company, Schenectady, NY (US)

( * ) Notice: Subject to any disclaimer, the term of this patent is extended or adjusted under 35 U.S.C. 154(b) by 978 days.

(21) Appl. No.: 09/854,050

(22) Filed: May 11, 2001

(65) Prior Publication Data

US 2002/0169837 A1 Nov. 14, 2002

(51) Int. Cl.⁷ .................. G06F 15/00; G06F 17/30; G06F 15/16
(52) U.S. Cl. .................. 358/1.15; 707/10; 709/219
(58) Field of Search .................. 358/1.15; 709/219; 707/10

(56) References Cited

U.S. PATENT DOCUMENTS 6,839,745 B1 * 1/2005 Dingari et al. .............. 709/219

2002/0044219 A1 * 4/2002 Mitts et al. .................. 348/465

* cited by examiner

Primary Examiner—Kimberly Williams
Assistant Examiner—Saeid Ebrahimi-Dehkordy
(74) Attorney, Agent, or Firm—Quarles & Brady LLP; Carl Horton (57) ABSTRACT

A method for enabling client side batch printing in a computer network environment wherein system users subscribe to specific report types and request delivery or printing of those reports at specific times, a server monitors the time and when the time corresponding to a specific report or group of reports occurs, accesses the data necessary to assemble the reports, places the reports in a printer-friendly format, compresses the reports for transmission and stores the compressed reports, provides notice to the system user that the reports are ready for printing and provides a deliver selector, monitors the delivery selector for activation and, when the delivery selector is activated, causes the compressed reports to be transmitted to a browser running on a workstation used by the user, decompresses the reports and prints out each one of the reports in a printer-friendly format.

18 Claims, 6 Drawing Sheets

| User (32) | Possible Report Types (34) |
|---|---|
| 0001 | A for Areas X or Y |
| | B for Any Area |
| | C for Any Area |
| | D for Areas X or Y |
| | E for Area M |
| | ... |
| | Q for Area L |
| 0002 | A for Area B |
| | C and D for Areas M and N |
| | ... |
| 0003 | B for Area A |
| ... | ... |
| 0040 | ... |

| User (38) | Report Subset (40) | Report Time (42) |
|---|---|---|
| 0001 | A for Area Y | Every Other Friday at 2PM |
| | C for Areas D and E | Every Other Friday at 2PM |
| | D for Area X | Every Friday at 2PM |
| | E for Area M | Every Day at 1PM |
| | Q for Area L | Every Other Friday at 2PM |
| 0002 | A for Area B | Every Other Friday at 2PM |
| | C for Area M | Every Other Friday at 2PM |
| | C for Area N | Every Other Friday at 2PM |
| | D for Area M | Every Other Friday at 2PM |
| | D for Area N | Every Other Friday at 2PM |
| | ... | ... |
| 0040 | ... | ... |

For report A and area X select the day and time at which the first report should be delivered along with a period thereafter indicating the period between consecutive report deliveries.

| Periodicity? | First Report Day and Time: | | | | | |
|---|---|---|---|---|---|---|
| | | 2AM | 6AM | 10AM | 2PM | 6PM | 10PM |
| Daily ○ | M | | | | | | |
| Weekly ○ | T | | | | | | |
| Biweekly ⊗ | W | | | | | | |
| Monthly ○ | Th | | | | | | |
| Quarterly ○ | F | | | | X | | |
| | S | | | | | | |
| | Su | | | | | | |

Submit

WEB BASED CLIENT SIDE BATCH PRINTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is document printing and more specifically network based batch printing of documents on remotely located client side printers.

While the present invention is applicable to many different industries, in order to simplify this explanation the invention will be described in the context of an exemplary medical facility. In addition, for the purposes of this explanation it will be assumed that forty different unit managers work at the exemplary facility and that each manager requires a different set of five reports to be delivered every other Friday.

Most medical facilities include several separate units, each unit managed by a different manager responsible for delivering services to facility customers within a prescribed budget. For example, a typical medical facility will include an intensive care unit, a laboratory, a medical/surgery unit, a radiology unit and so on. In order to stay within a budget unit managers typically require some type of report that describes the costs associated with running their units.

Early systems for reporting cost and other operational information typically required the unit managers to develop their own cost tracking schemes. As facilities have grown and unit manager duties have increased, medical facilities have increasingly turned to hiring facility administrators to develop and provide cost tracking tools.

Thus, facility administrators have developed reporting tools that periodically deliver cost and other information to unit managers. For instance, unit managers may receive cost tracking reports on a pay period (e.g., every other Friday) basis that can be used to determine if the particular units are within budget.

One common way to provide tracking reports has been to provide printed copies of reports to unit managers. In these cases the facility administrator typically prints out the reports via an administrator's computer/printer and sends the reports via inter or intra-facility mail.

To streamline the printing process where hardcopy reporting is used, systems have been developed that facilitate automatic server side batch printing of reports on a periodic basis. For instance, in the example described above where there are forty unit managers and each requires five separate reports every other Friday, a batch printing system can be set up so that all of the reports are printed out for routing to the unit managers at the prescribed times. Thereafter the administrator would arrange to have the reports delivered to the requesting managers.

While hard copy reporting has been used in many cases, this solution has several shortcomings. First, this solution requires the administrator to print out many different reports. Similarly, this solution requires routing of each of the reports to the correct unit manager recipients. Often there are many different ways to configure a report and each unit manager may want his reports to be configured in a special way that is distinct form all other reports. In addition, different reports may include different types of information and therefore some unit managers may require more than one report per reporting period. Report scheduling, configuring, printing and routing require administrative time and therefore are relatively expensive.

Second, even where a report is delivered to a unit manager, there is no guarantee that the report will be timely noticed by and reviewed by the manager. In many cases administrative reports are simply heaped onto a pile of other reports and published information and unit managers will not review the reports until the information therein is stale.

Third, when a manager wants to change his reporting preferences, the manager has to contact the administrator and request changes to either report configuration, report types or both. Thereafter, the administrator has to make the requested changes to make sure that the manager receives the desired reports. Clearly this changing process requires administrative time and requires some knowledge on the part of the manager regarding different reporting types and also how to change required reports.

Fourth, in any system requiring human intervention there is always a delay between the time when information is ripe and the time when information can be delivered in a report format. While not fatal, these days can ripple through the reporting system to cause the end result, analysis of the data to take corrective action where necessary, to be further delayed.

Fifth, hardcopy reports can be misplaced either during routing or after delivery to a manager. In these cases a manager would have to request another set of reports from an administrator.

Sixth, while a manager may want a specific set of reports on a repetitive basis (i.e., every other Friday), the manager may only sporadically want some other report to be able to check on costs or other facility operating parameters. Also, in this regard, the manager may want to print a report at a time different than the prescribed time (e.g., between every other Friday). Again, in this case, the manager would have to work through the administrator to obtain the desired report.

With the advent of networked computing systems new and useful ways to distribute information have been developed. For example, database information can now be accessed on the Internet via any of several different commercially available browser packages. In this regard a database host server may be equipped to provide information in hypertext markup language (html) format that defines an on-screen report format as well as provides substantive information to be included in the on-screen report. Html on-screen reports can be browsed (hence the term "browser") by scrolling vertically and often horizontally and can be printed out on client side (i.e., at a unit manager's printer) local printers by the separate managers (i.e., a manager examining a report can typically print the report by selecting a "Print" icon via the browser.

On-screen Internet-based reporting schemes are advantageous for several reasons. For instance, these schemes make information available immediately upon storing of the information in a database. In addition, these schemes allow users to access massive amounts of information and often allow users to select one of several different ways in which to view information. Moreover, when an on-line reporting system is implemented, there is no need for an administrator to print out and route reports. Instead, whenever a manager requires a report, the manager can access the online system and obtain the information required.

Unfortunately, despite the advantages of on-screen reporting, there are also some disadvantages with such systems. First, while browser scrolling features may be advantageous when used on a display screen, when on-screen browser information is printed out, the on-screen information is not formatted to fit on standard sized paper and therefore, either information extends laterally off a printed page or extends vertically off the end of the page.

Second, often the html screen shots include html formatting codes that have nothing to do with the substantive information in the reports but that show up upon printing. Html format codes and the scrolling problem together cause printed html documents to appear jumbled and of low quality in many cases.

Third, where a manager is required to access reports periodically upon his own volition, often the manager will either forget to access the reports, will not access all of the relevant information or reports or will access the reports after the information therein is irrelevant (i.e., in an untimely fashion). This accessing problem is exacerbated where the unit manager accesses the reporting browser only seldomly (e.g., every other week) and where the manager has to search the database for desired information. When a manager only seldomly accesses a tool, often the manager is not very efficient at using the tool and such inefficiency often discourages use. Even with well designed browsers the task of searching a large database for specific information can be tedious which, again, discourages use.

Fourth, where a manager requires more than one report the manager has to search the database for each of the desired reports and must print out each of the desired reports separately. For instance, in the present example where each manager requires five separate reports, the manager has to find each of the five reports and has to separately print out each of the reports—a time consuming process.

One other network-based solution to the information distribution problem discussed above is to send reports to managers as parts of e-mails or, in the alternative, as separate attachments to e-mails. E-mail format typically does not include sufficient formatting information to provide a professional looking report and therefore this approach is not much better than the on-screen reporting systems. On the other hand, e-mail attachments can be formatted in acceptable manner such that, when printed, the printed product has a professional appearance.

Despite the advantages of delivering reports via e-mail attachment, once again this solution has disadvantages. First, this solution, like the on-screen solution, requires managers to step through printing sequences several times in order to print each attached report. Second, to modify the reports, report configurations or the times when reports are delivered for a manager, again, the manager has to work through the administrator. Third, where it is necessary to provide a searchable system so that managers can access data at any time and in any format they choose, a separate on-screen system would have to be supported.

BRIEF SUMMARY OF THE INVENTION

An exemplary embodiment of the invention includes a method for use with a network of computers including a database server and at least one computer running a network browser used by a system user to communicate with the server, the database including data to be assembled into different reports, the method for facilitating on-line report delivery to the browser and comprising the steps of providing a list of reports including a report subset of reports to be generated for the system user and a report time indicating when the report subset should be generated, after the report time occurs: notifying the system user that the report subset is ready for delivery, retrieving the data required to generate the report subset, assembling each report in the report subset in a format where the information on the reports is placed in a printer friendly format such that the data is formatted to fit on a standard sized printer paper, combining the report subset into a report construct and delivering the report construct to the browser via the network.

In some embodiments delivery includes printing, in other embodiments delivery may include storing the reports on the user's network for subsequent printing while in still other embodiments delivery may include both storing and printing. In some embodiments printing is accomplished via downloading of an applet or some other pulse sequencing program to a user's computer network, the applet retrieving reports and also controlling the printing process. In some applications the printing process is automatic. That is, at the prescribed time to print a report(s), the server causes the reports to be printed. In other applications, when reports are ready to be printed, the server provides a message to the user along with a selection icon or tool that can be used by the user to indicate that the printing process should commence. Thus, in some applications reports are stored in a report construct for deliver to the user prior to printing.

In some embodiments the step of providing includes providing a list of possible reports that can be generated for the first system user and providing a report selector for selecting the sub-set of the possible reports and for selecting the report times at which the reports are to be generated, receiving the user selections and storing the selections as the report subset for the user. In this regard, the step of providing the list of possible reports and the report selector may include providing the list and the report selector via the browser.

Another exemplary embodiment includes a method for use with a network of computers including a database server, at least one computer running a network browser that is used by a system user to communicate with the server and at least one printer attached to the at least one computer, the method for facilitating on-line printing using the at least one printer and comprising the steps of, for at least the system user, generating at least one printer friendly report where the information on the report is formatted to fit on a standard sized printer paper, storing the at least one printer friendly report on the server, providing a delivery selector via the browser that, when activated, indicates that the at least one report should be printed on the at least one printer, monitoring for activation of the delivery selector and when the delivery selector is activated transmitting the at least one report from the server to the browser and causing the report the be printed on the first printer.

In some embodiments the step of generating includes generating at least two reports and wherein the step of providing includes providing a print selector via the browser for selecting at least a subset of the at least two reports, when the selector is activated, transmitting the subset of reports and causing the subset of reports to be printed via the first printer.

Yet another exemplary embodiment includes a method for use with a network of computers including a database server and at least one network browser running on a first computer used by a first system user to communicate with the server, the network also including a first printer attached to the first computer, the database including data to be assembled into different reports, the method for facilitating on-line report delivery to the browser and comprising the steps of receiving a report request including a report time for generating at least one report, when the report time occurs, retrieving information required to assemble the at least one report, assembling the at least one report in a printer friendly format, transmitting the report to the browser and printing the report on the first printer.

In addition to the methods described above and in more detail below, the invention also includes apparatus for performing the methods.

These and other and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Referring now to the figures and, specifically referring to FIG. 1, the present invention will be described in the context of an exemplary computer network system 10 as illustrated. System 10 includes a plurality of personal computers or workstations 12, 13, 14 and 15 that are linked via a network (in the illustrated example the Internet 18), to a server 20 where the server 20 has access to a database 22.

Each of workstations 12–15 are identical and therefore, only workstation 12 will be described here in any detail. Workstation 12 includes a computer screen or display 17 and an interface device such as a keyboard 19. In addition, server 12 includes a processor (not illustrated) and a local database (e.g., disc drive) (also not illustrated). Workstation 12 is linked to a dedicated local default printer 21. As well known in the art, workstation 12 can be used for various purposes including both network and local computing processes.

Each of workstations 12–15 is linked via the Internet 18 to server 20 so that computer programs running on each of the workstations 12–15 can cooperate in two-way communication with server 20. Server 20 is linked to database 22 to retrieve information therefrom and to store information thereto. Database 22 includes a plurality of different tables which are used by server 20 to perform the various inventive methods.

Figure 3:
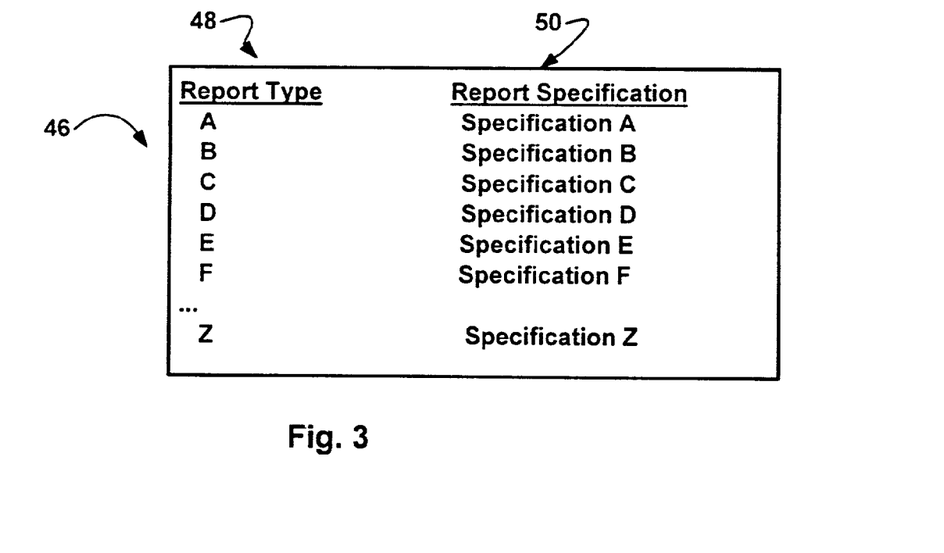
FIG. 3 is a database table used in one inventive method according to the present invention.

Referring now to FIG. 3, a "Report-Type" database table 46 stored in database 22 includes a report-type column 48 and a report specification column 50. In the report-type column 48, table 46 lists every report type that is supported by database 22. In the illustrated example, the report types include types A through Z for a total of 26 separate report types. The report specification column 50 includes a separate specification for each of the report types in column 48. For example, there is a specification A corresponding to report type A, a specification B corresponding to report type B and so on. Each of the specifications in column 50 describes the type of information that has to be included in the corresponding report type, may indicate format information to be used to format the corresponding report type an may also include additional information instructing server 20 with respect to where to locate the information in database 22 that is needed to construct or assemble the particular report type. For the purposes of the present invention it is assumed that table 46 has already been constructed and is stored in database 22.

Figure 4:
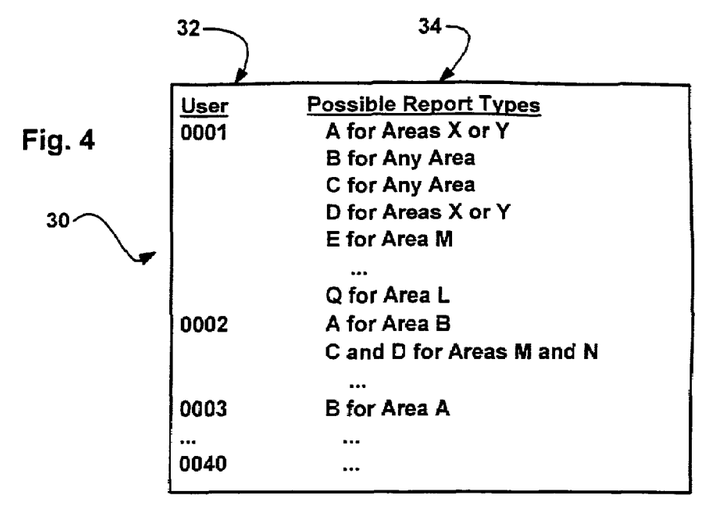
FIG. 4 is a database table used in conjunction with the method of FIG. 2.

Referring now to FIG. 4, another database table 30 that is stored on database 22 includes a user column 32 and a possible reports type column 34. User column 32 separately lists each system 10 user within a facility. For example, exemplary users are identified by identification numbers 0001, 0002, and so on. The users are typically medical facility unit managers that are responsible for specific portions of the medical facility. For example, one user may be the manager of a laboratory within a medical facility, a second user may be the manager of an emergency room in a medical facility, a third user may be the manager of an intensive care unit at the medical facility and so on. For the purposes of the present explanation it will be assumed that user 0001 is the emergency room manager.

Each of the users has responsibility for managing their specific units and some users may have responsibility for overseeing management of more than a single unit. Because managers have different responsibilities, some managers may need to have access to certain types of reports for certain facility areas or units while other managers may have the need for other types of reports corresponding to other facility units or areas. To this end, the possible report types column 34 includes all possible reports that a particular user may request and be granted access to. For example, with respect to 0001, FIG. 4 indicates that that particular system user can have access to a plurality of different report types for various areas or units within the medical facility. One possible report type and corresponding area is report type A for areas X or Y. Another possible report type and corresponding area is report type B for any area. A third possible report type accessible or requestable by user 0001 is report type C for any area, and so on.

Referring still to FIG. 4, with respect to user number 0002 there is another subset of possible report types and corresponding areas that that particular user can request and be granted access to. As with the table in FIG. 3, for the purposes of the present invention it is assumed that table 30 of FIG. 4 has already been instantiated and has been stored in database 22.

Referring now to FIGS. 1–4, a subscribing method will be described. In this case and in the description that follows, unless indicated otherwise, the method of FIG. 2 and other methods described herein will be described in the context of system user 0001 and that particular system users' possible report types as illustrated in FIG. 4.

Figure 1:
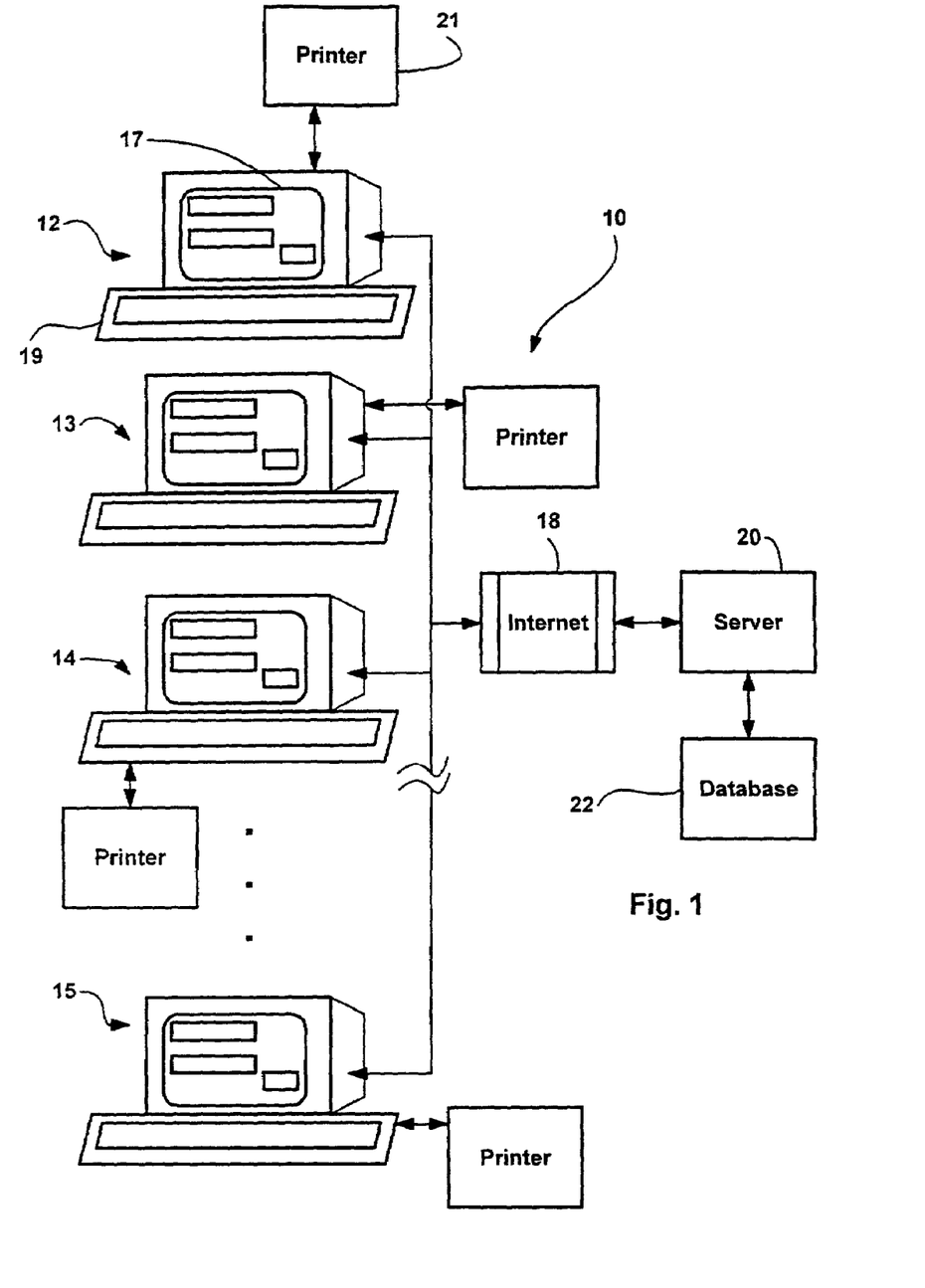
FIG. 1 is a schematic view of a network computer system that performs the methods according to the present invention.
Figure 2:
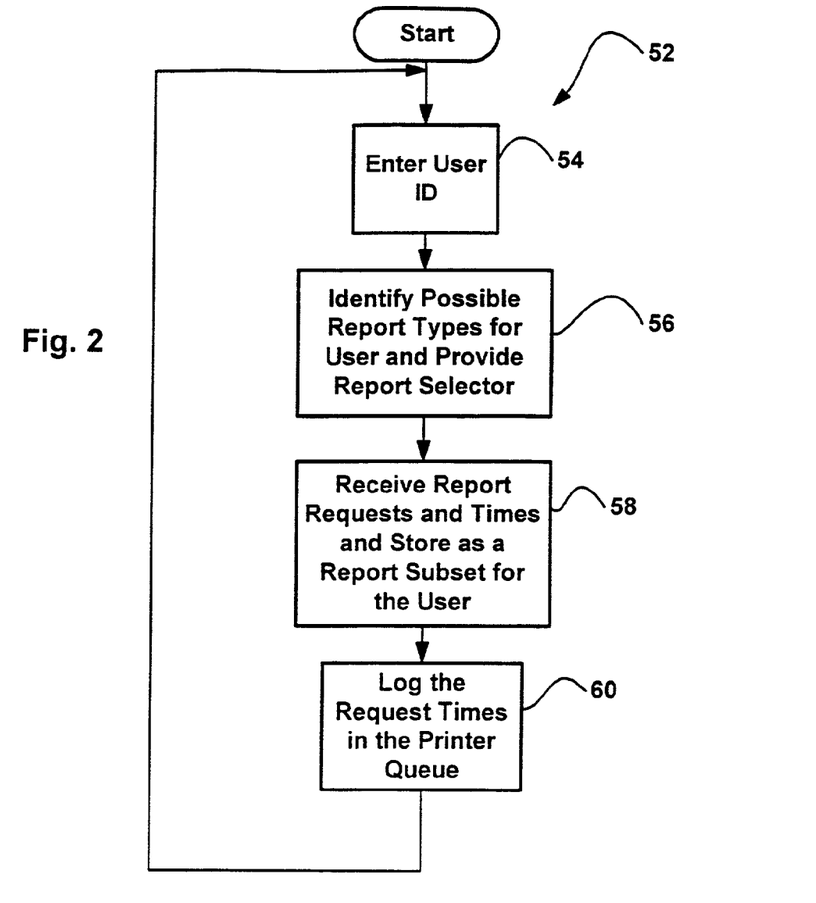
FIG. 2 is a flow chart illustrating a subscription method performed by the system of FIG. 1.

In FIG. 2, the subscribing method 52 begins at process block 54 where system user 0001 uses workstation 12 (see FIG. 1) and a browser package to perform a log-on process whereby user 0001 enters a user name and/or a user password to gain access to server 20. Herein it is assumed 0001 is the password for user 0001. Upon receiving the user name and/or password, server 20 determines whether or not user 0001 is an authorized system user and, if not, server 20 does not allow the user to access any information in database 22. However, if user 0001 is an authorized system user, server 20 next correlates the user id with possible report types and areas corresponding to the report types that that particular user can request and access. This correlating step is represented by process block 56 in FIG. 2. Thus, in the present example, server 20 may correlate the user number 0001 with the possible report types in column 34 of table 30 (see FIG. 4).

Figure 5:
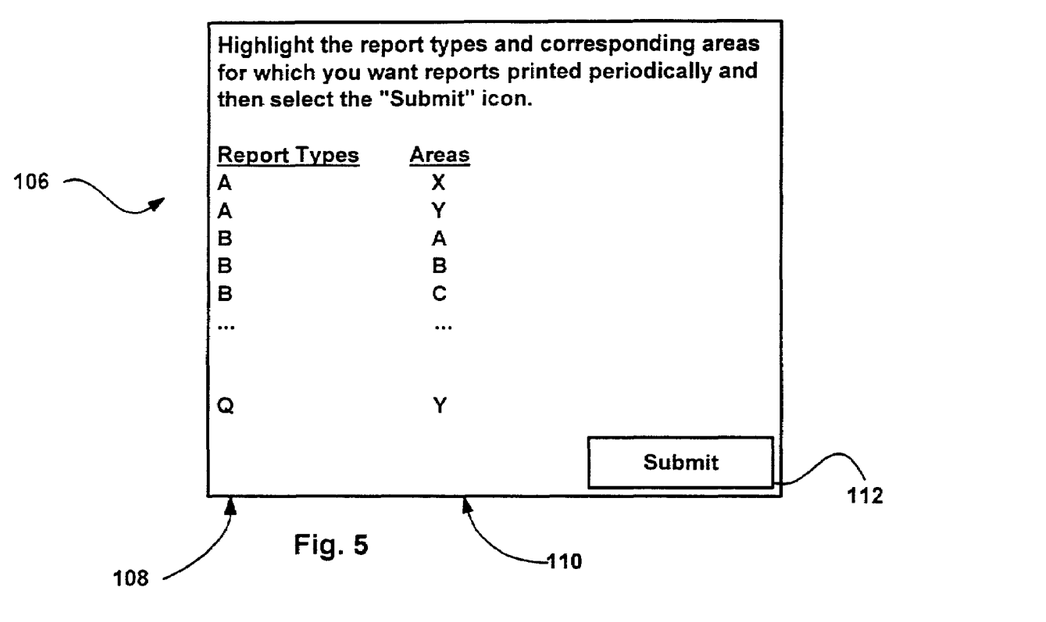
FIG. 5 is a browser page usable with the method of FIG. 2.

Referring also to FIG. 5, after the possible report types have been identified, server 20 causes a report selector tool 106 to appear on the screen of workstation 12. To this end, the server 20 generates a hypertext mark-up language (html) page and transmits the page to the browser running on workstation 12. The selector tool includes instructions and a list of the possible report types and corresponding areas that the particular user can access and subscribe to. Thus, as illustrated in FIG. 5, the selector tool 106 instructs the system user to "highlight the report types and corresponding areas for which you want reports printed periodically and then select the "submit" icon period".

In addition, selector tool 106 provides a list of the different report types in a report types column 108 and corresponding areas for which those reports may be generated for the particular user in an areas columns 110. Selector tool 106 also includes a "submit" icon 112 which, after the particular report types and corresponding areas have been highlighted, can be selected to submit the subscription to server 20.

Any means for highlighting the report types in areas and for selecting the submit icon 112 can be used. For example, the keyboard corresponding to workstation 12 could be used, or, in the alternative, a mouse controlled cursor could be used as well known in the art.

After the report types and areas have been selected, the system user selects icon 112 and the subscription request is sent to server 20. Referring still to FIGS. 1–4 and also to FIG. 6, after server 20 receives the subscription request for each report type requested, server 20 generates a separate html page and transmits the html page back to workstation 12. The separate html pages corresponding to each report are sent separately and consecutively such that the system user considers a separate time selector screen or tool 114 for each of the report type and area combinations. The time selector tool or screen 114 includes instructions for using the tool and some interactive icons for selecting the time for printing the corresponding report type and area. For instance, the instructions illustrated instruct that "For report A and area X select the day and time at which the first report should be delivered along with a period thereafter indicating the period between consecutive report deliveries."

Figure 6:
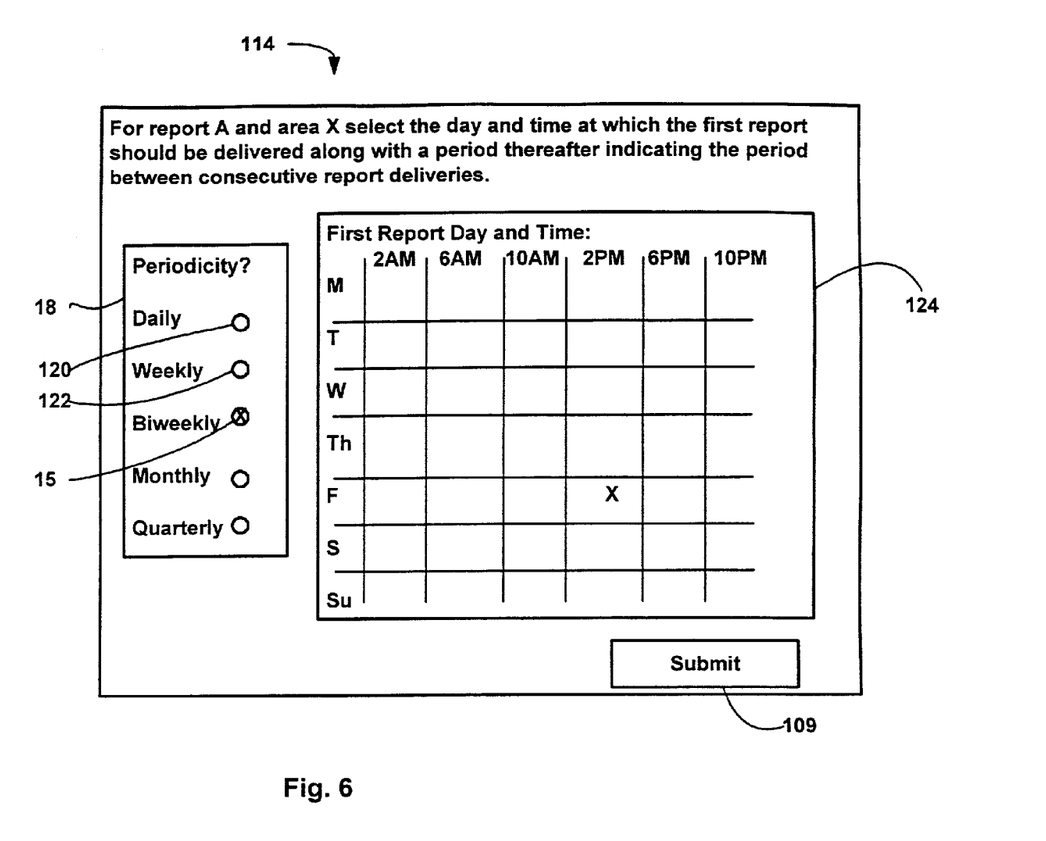
FIG. 6 is a browser page usable with the method according to FIG. 2.

In addition, time selector tool 114 includes a first report day and time matrix 124 and a periodicity matrix 118. The day and time matrix 124 includes a left-hand day column listing each of the days of the week Monday through Sunday and separate time columns corresponding to 2 a.m., 6 a.m., 10 a.m., 2 p.m., 6 p.m. and 10 p.m. In this case, the user would select a particular time and day for delivery of the particular report for the specific area by placing a mark in one of the boxes in the matrix 124. For example, an "x" appears in the matrix box corresponding to 2 p.m. on Friday which would indicate that for the particular report and area, the report should be delivered or indicated as being deliverable on the next Friday at 2 p.m.

Next, the system user would select one of the schedules corresponding to periodicity in element 118. This can be accomplished by placing a mark in one of the selection icons (e.g., 120, 122, 115, etc.). As illustrated, an "x" has been placed in icon 115 indicating that the report should be delivered on a bi-weekly basis or, in other words at 2 p.m. every other Friday. As above, the selection tool or interface device used to specify the delivery times via FIG. 6 may be any tool known in the art including a keyboard, a mouse controlled cursor, some other screen pointing device or the like. After the first report day and time and the periodicity have been specified via time selector screen 114 the system user selects the "submit" icon 109 which transmits the entered information to server 20.

As indicated above, a separate time selector screen 114 is provided for each report and area combination that was earlier requested by the system user. Each time the system user independently selects the first report day and time for the particular report and area combination and then selects the periodicity. Thus, the user may select different times and different periodicity for deliver of each of the separate reports. After all of the times and periodicity have been submitted to server 20, at process block 58 server 20 stores the report subset for the particular user along with each of the times for delivery of reports. Next, at process block 60 server 20 logs the request times for report delivery in a printer queue.

Figure 7:
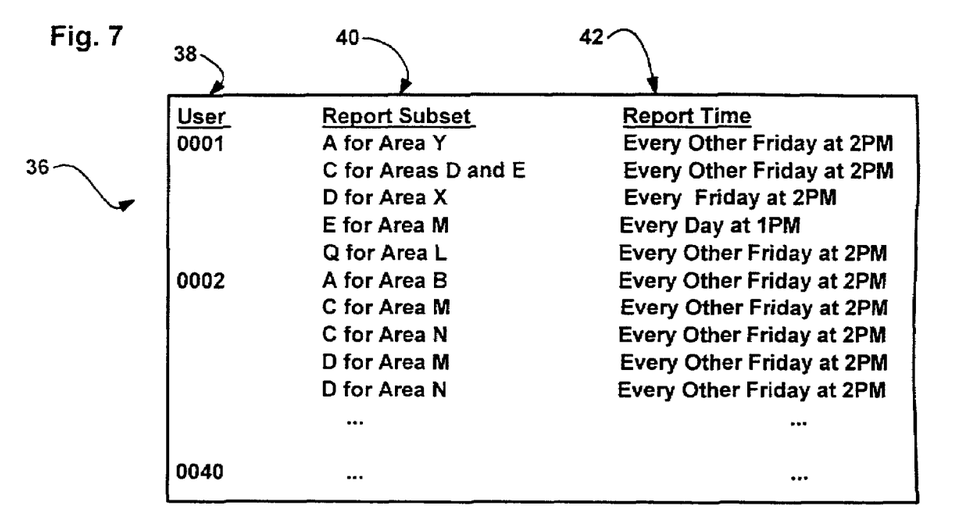
FIG. 7 is a database table used in one method according to the present invention.

Referring now to FIG. 7, an exemplary printer queue 36 is illustrated. Queue 36 includes a user column 38, a report subset column 40 and a report time 42. The user column 38 includes a list of all of the system users that have subscribed to any of the reports that the system supports. Thus, in the present case system user 0001 is identified in column 38. Report subset column 40 lists all of the reports that a user in column 38 subscribed to. In the case of user 0001, for example, that user subscribed to reports A for area Y; C for area D and E; D for area X; E for area M; and Q for area L. Thus, user 0001 wants to have each of reports A, C, D, E and Q for the particular areas assembled and made ready for user 0001 to print out at particular times.

Report time column 42 indicates the times that each of the reports in report subset column 40 is to be made available for delivery and printing. For example, with respect to the report A for area Y that was requested by user 0001, that report is to be delivered every other Friday at 2 p.m. Similarly, for report E for area M subscribed to by user 0001, that report is to be delivered ever day at 1 p.m. and so on.

After a user has specified the report subset and the report times corresponding to each report in the subset and that information has been stored in database 22 via server 20, server 20 controls report generation and delivery.

Figure 8:
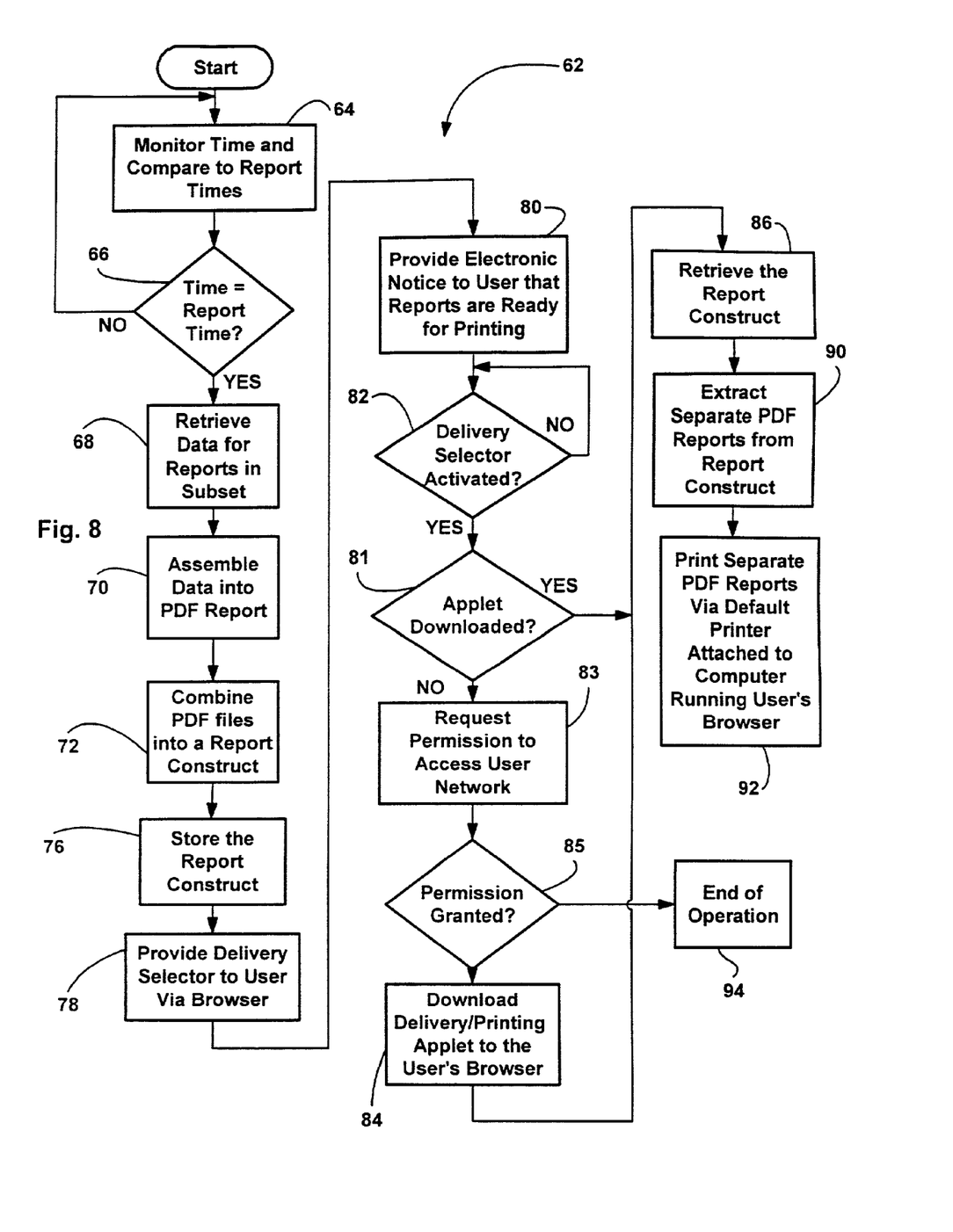
FIG. 8 is one method according to the present invention.

To this end, referring now to FIG. 8, a report assembly, delivery and printing method 62 is illustrated. Referring also to FIGS. 1 and 7, at process block 64, server 20 monitors the day and time and compares the day and time to the day and time combinations in column 42 of table 36. Until the current time equals one of the report times in column 42, control of server 20, at least with respect to operation of the present invention, loops back to process block 64 where the time comparison continues. However, when the current time is equal to any of the times in column 42, control of server 20 passes to process block 68. At process block 68 server 20 determines the report type in column 40 corresponding to the specific report time that has occurred in column 42. For the purposes of the present invention, it will be assumed that the time corresponding to report A in column 40 for user 0001 has accrued. Thus, in the present example, it is assumed that the time is Friday at 2 p.m. and that no report was delivered on the previous Friday. It should be appreciated that, in addition to the time to generate report type A for user 0001, table 36 also indicates that report types C, D and Q should also be generated at the current time (i.e. every other Friday at 2 p.m.).

In any event, after identifying the report types that are to be generated and the specific area for which the report types should be generated at the current time, server 20 accesses table 46 illustrated in FIG. 3 and correlates the particular report types with the report specifications in columns 48 and 50, respectively. As indicated above, each specification in column 50 indicates the information required to instantiate a particular report time, may include formatting information corresponding to how the report should be laid out and may also include information corresponding to where the data can be located that is necessary to instantiate the report type. After the report specification for a particular report type has been identified, at process block 68 in FIG. 8, server 20 retrieves the data for the particular report type. Next, server 20 assembles the data into a PDF report at block 70 and control passes to block 72. This process is repeated for each of the particular report types that is to be generated for the particular user at the current time. As indicated above, in the present example, because each of reports A, C, D and Q are to be prepared at the current time, this process of retrieving data and assembling the data into a PDF report is repeated four time so that four separate PDF reports are generated.

Various methods are contemplated for collecting and assembling data into PDF reports. For instance, one exemplary collection/assembly method requires the server to query the database 22 using very few joins to return a result set that is rendered as an html document. After the html document is formed, that document is then converted into the PDF report. To minimize the number of joins the data includable within any of the report types may be stored in a limited number of database tables. For example, an exemplary system may include only 2 tables, each table corresponding to a different class (i.e., a sub-set of the report types having some common characteristics) of reports where there are only two classes of reports. In this case, when the time comes to assemble a report, server 20 first recognizes the class of report, then forms a query and applies the query to the table corresponding to the class type. In this manner the report information can be obtained with minimal or no joins to speed up generation.

Continuing at process block 72 in FIG. 8, server 20 next compresses all of the PDF files that are to be delivered to the system user 0001 into a single report construct that is suitable for transmission via a computer network. Thus, the report construct is in a network transmission format.

Continuing, at process block 76 server 20 stores the transmission construct. At process block 78 server 20 provides a delivery selector to the user via the browser running on workstation 12. To this end, referring to FIGS. 1, 8 and 9, server 20 constructs another html page 100 and sends the page 100 via the Internet 18 to the browser running on workstation 12. The html page (i.e., the delivery selector) includes instruction 102 and "print" icon 104. The exemplary instructions instructs that "Your reports are ready to be printed. Select the "print" icon below, to commence printing on your default printer." Referring still to FIG. 8, in addition to providing the delivery selector or screen 100, optionally, an electronic notice may be provided to the user at block 80 indicating that the reports are ready for printing. For example, the electronic notice may be by way of an e-mail to the user so that the user knows that the next time the user is in a position to access the Internet, the user can go to the html print page 100 and commence printing of the reports that were requested.

Figure 9:
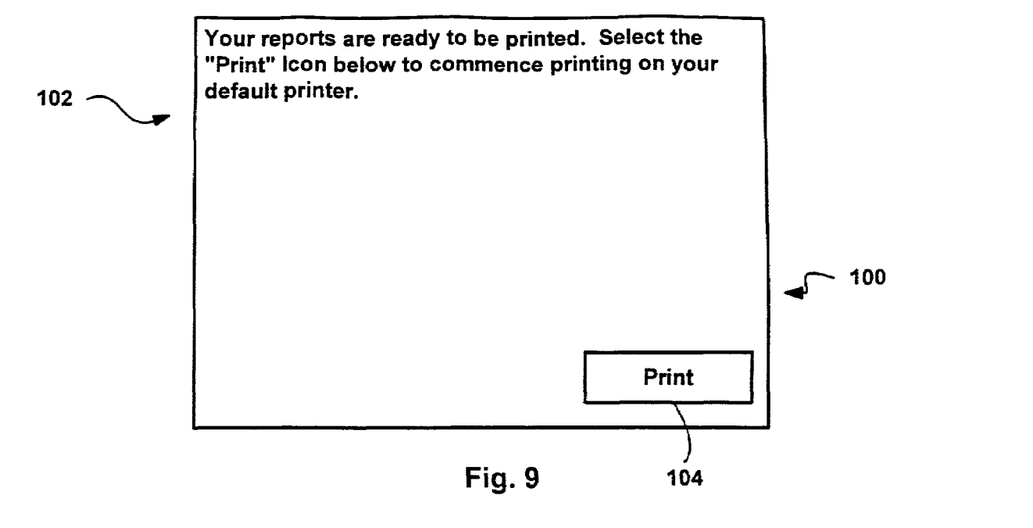
FIG. 9 is a browser page usable with the method of FIG. 8.

Referring to FIGS. 1, 8 and 9, at decision block 82, server 20 monitors for selection of the delivery selector (i.e., selection of print icon 104). Where icon 104 is not selected, server 20 loops back and continues to monitor for activation. Where icon 104 is selected, control passes to block 81 where server 20 determines if a PDF delivery applet has already been downloaded to the user's computer network. The delivery applet is a short software program that, if downloaded to the network, runs on the network to obtain or retrieve report constructs from the server, de-compresses the constructs, extracts the separate PDF reports and cause the reports to be printed on the default printer. Because of typical security considerations on computer networks, the user has to affirmatively grant the web server access to the user's network to download the applet. It is contemplated that the applet would only be downloaded a first time and thereafter server 20 could identify applet presence on the user's network and skip the request for permission to access.

Thus, referring still to FIG. 8, assuming a first time user and that the applet has not been downloaded, at decision block 81 control of server 20 passes to block 83. At block 83 server 20 generates another html page (not illustrated) requesting permission to access the user's network. This request would likely include instructions regarding the entity requesting access and why access is necessary for client side printing. In addition some type of "accept" and "deny" access icons would likely be provided that are selectable in the usual fashion (e.g., via mouse controlled icon).

At block 84, server 20 monitors for permission to access the network. At block 94, where permission to access is denied server 20 ends the session. However, when permission to access is granted control passes to block 84 where server 20 downloads the delivery/printing applet to the user's browser running on workstation 12. The applet is stored on the user's network and, each time thereafter, when the delivery selector (i.e., print icon) is activated, the applet performs a delivery and printing function.

Continuing, at block 86 the applet retrieves the report construct from the server and at block 90, the applet extracts the separate PDF reports from the report construct. At block 92 the applet prints the separate PDF reports via the default printer attached to workstation 12 (i.e., printer 21).

It should be understood that the methods and apparatuses described above are only exemplary and do not limit the scope of the invention, and that various modifications could be made by those skilled in the art that would fall under the scope of the invention. For example, while the deliver/printing software construct is referred to as an applet, various other software constructs (e.g., any suitable pulse sequencing program) are contemplated. In addition, the printing format need not be PDF and any of several other standard formats are contemplated.

Moreover, after the applet is provided on a user's network, any time the user's network is operating the server and network may cooperate to automatically cause reports to be printed when a subscription time occurs without requiring the user to begin the printing process. In this case, after printing is completed, server 20 may send a status update to the user via email, a beeper message or the like. Furthermore, while the system is particularly useful for batch printing, the system is also useful for enabling a user to print reports immediately upon request. Thus, it is contemplated that a user may select one or more reports for immediate printing. In this case, assuming the data required to generate the reports is already stored, when the user selects an "immediate print" icon (or some similar icon), server 20 would immediately retrieve required information, assemble the reports, convert each report to PDF format, compress the reports into a report construct suitable for transmission and store the reports. Next the applet (assuming previous download) retrieves the report construct, de-compresses the report construct to extract each PDF report and then cause each report to be printed via the default workstation printer.

Moreover, in addition to providing printing capabilities, it is contemplated that the present invention may facilitate storage of printer friendly reports on the user's network for on-line review or subsequent printing. In this case the process would be similar to the process of FIG. 8 except that, instead of causing reports to be printed, selection of a delivery icon would cause the reports to be stored on the network for subsequent viewing/printing.

To apprise the public of the scope of this invention, the following claims are made:

What is claimed is:

1. A method for use with a network of computers including a database server and at least one computer running a network browser used by a system user to communicate with the server, the database including data to be assembled into different reports, the method also for use with a pulse sequencing program that is loadable onto the at least one computer, the program capable of downloading report constructs from the server, the method for facilitating on-line report delivery to the browser and comprising the steps of:

providing a list of reports including a report subset of reports to be generated for the system user and a report time indicating when the report subset should be generated;

after the report time occurs:

notifying the system user that the report subset is ready for delivery;

retrieving the data required to generate the report subset assembling each report in the report subset in a format where the information on the reports is placed in a printer friendly format such that the data is formatted to fit on a standard sized printer paper;

combining the report subset into a report construct; and delivering the report construct to the browser via the network, wherein the step of delivering includes the step of downloading the pulse sequencing program to the at least one computer and causing the program to retrieve the report construct.

2. The method of claim 1 wherein the step of combining includes compressing the report construct and wherein the step of delivering includes transmitting the compressed report construct to the network browser and converting the compressed report construct back into the printer friendly report construct.

3. The method of claim 1 wherein the program is also capable of converting the compressed report construct back into the printer friendly report construct and wherein the step of converting includes causing the program to convert the compressed report construct back into the report construct.

4. The method of claim 2 further including the step of, after converting back to the printer friendly report construct, causing each of the list reports to be printed via a printer attached to the at least one computer.

5. The method of claim 1 wherein the printer friendly report construct is the portable document format.

6. The method of claim 1 wherein the step of notifying includes sending an electronic message to the fist user.

7. The method of claim 6 wherein the step of notifying includes providing an indication via the browser that the reports are ready.

8. The method of claim 7 wherein the step of notifying further includes the step of providing a delivery selector via the browser that is activatable to indicate that delivery should commence and wherein the method further includes monitoring the delivery selector for activation and delivering when the activator is activated.

9. The method of claim 8 wherein, after the step of converting and prior to the activator being activated the method further includes the step of storing the report construct on a database linked to the server.

10. The method of claim 7 wherein delivery includes the step of printing the reports on a printer attached to the at least one computer.

11. The method of claim 1 wherein the steps of retrieving, assembling and converting occur prior to the step of notifying.

12. The method of claim 6 wherein the message is sent via e-mail.

13. The method of claim 1 wherein the step of providing includes providing a list of possible reports that can be generated for the first system user and providing a report selector for selecting the sub-set of the possible reports and for selecting the report times at which the reports are to be generated, receiving the user selections and storing the selections as the report subset for the user.

14. The method of claim 13 wherein the step of providing the list of possible reports and the report selector includes providing the list and the report selector via the browser.

15. A method for use with a network of computers including a database server, at least one computer running a network browser that is used by a system user to communicate with the server and at least one printer attached to the at least one computer, the method for facilitating on-line printing using the at least one printer and comprising the steps of:

for at least the system user, generating at least one printer friendly report where the information on the report is formatted to fit on a standard sized printer paper;

storing the at least one printer friendly report on the server;

providing a delivery selector via the browser that, when activated, indicates that the at least one report should be printed on the at least one printer;

monitoring for activation of the delivery selector; and when the delivery selector is activated;

transmitting the at least one report from the server to the browser; and causing the report the be printed on the first printer;

wherein the step of generating includes generating at least two reports and combining the reports into a record construct and wherein the step of transmitting includes transmitting the record construct to the browser.

16. The method of claim 15 wherein the step of combining includes compressing the at least two reports together to form a transmission suitable record construct that is in a network transmission protocol and wherein the step of causing the report to be printed includes extracting the at least two reports from the report construct and printing out each of the at least two reports in series.

17. The method of claim 15 wherein the step of generating includes generating at least two reports and wherein the step of providing includes providing a print selector via the browser for selecting at least a subset of the at least two reports, when the selector is activated, transmitting the subset of reports and causing the subset of reports to be printed via the first printer.

18. The method of claim 15 wherein the step of generating includes generating at least two reports and wherein the step of providing includes providing a print selector via the browser for selecting at least a subset of the at least two reports, when the selector is activated, transmitting the subset of reports and causing the subset of reports to be printed via the first printer.

* * * * *